June 21, 1960     B. N. BOURKE ET AL     2,942,052
SYSTEM FOR DETERMINING THE STATE OF
CHARGE OF ALKALINE BATTERIES
Filed June 17, 1955
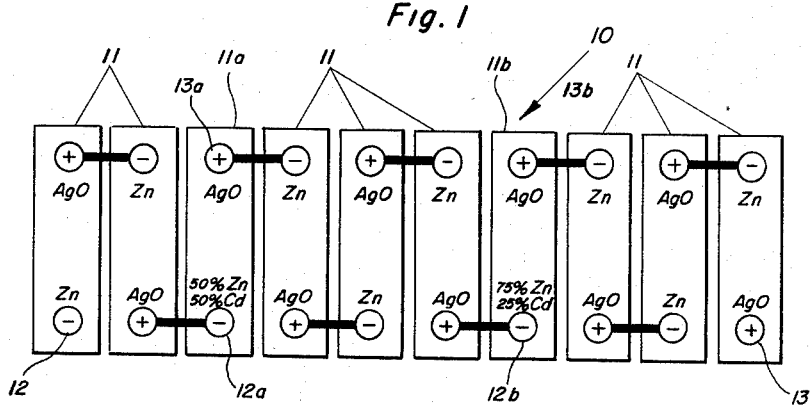
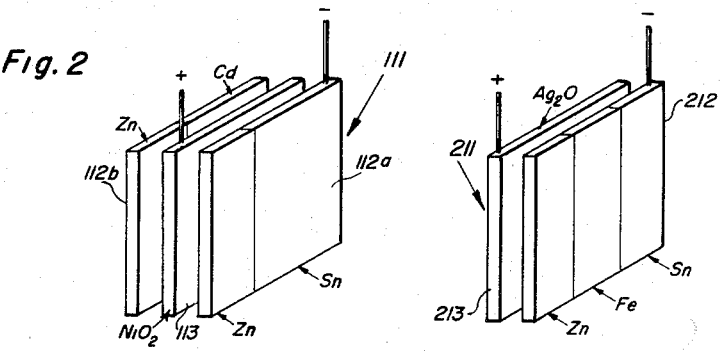
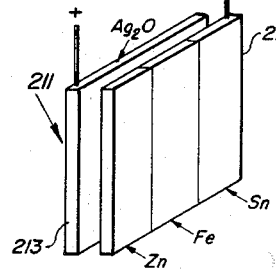
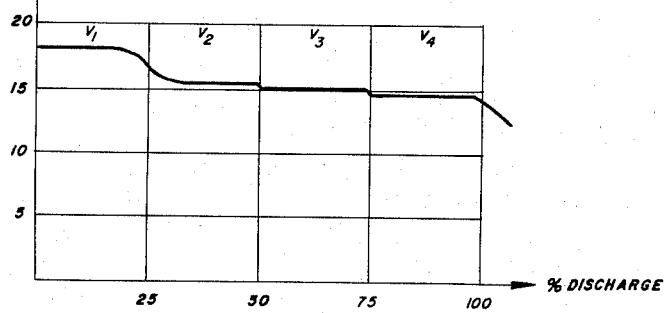
B. BOURKE
F. SOLOMON
INVENTORS.
BY *Karl F. Ross*
AGENT

United States Patent Office 2,942,052
Patented June 21, 1960

2,942,052

SYSTEM FOR DETERMINING THE STATE OF CHARGE OF ALKALINE BATTERIES

Boris N. Bourke, New York, and Frank Solomon, Jackson Heights, N.Y., assignors to Yardney International Corp., New York, N.Y., a corporation of New York Filed June 17, 1955, Ser. No. 516,122

6 Claims. (Cl. 136—6)

Our present invention relates to electric batteries composed of a plurality of series-connected cells using an alkaline electrolyte.

Batteries of this character, especially when utilizing positive and negative electrodes respectively containing silver and zinc, have well-recognized advantages over lead-acid batteries, including a much greater storage capacity per unit weight and volume. When properly designed, they can deliver a substantially constant terminal voltage over a large portion of each discharge. This property, while highly desirable, prevents the use of the terminal voltage as an indication of the approaching exhaustion of the battery's capacity. Whereas, furthermore, in acid batteries the specific weight of the electrolyte serves as an indicator for the state of charge, this expedient is not available in the case of alkaline cells.

This invention has for its principal object the provision of a method of determining the state of charge of an alkaline battery by the simple measurement of its terminal voltage, as well as the provision of a battery designed to enable such determination.

A more specific object of this invention is to provide an alkaline battery whose terminal voltage, while being substantially constant, shows one or more discontinuities small enough to be non-objectionable yet sufficiently distinct to indicate the completion of the delivery of a predetermined fraction of the total battery output.

We have found, in accordance with this invention, that a negative electrode composed of two or more metals, if discharged in an alkaline electrolyte against a positive electrode insoluble in such electrolyte, will first produce a relatively high potential difference with respect to the positive electrode and will maintain its potential until the most electronegative material in its composition has been used up; thereafter it will exhibit a slightly less negative potential difference until its component ranking second (from the negative end) in the electromotive series has been consumed, and so forth. In this manner, and provided that the mass of the positive electrode is electrochemically at least equivalent to the total mass of the composite negative electrode, a terminal voltage will be obtained whose discontinuities indicate predetermined stages in the depletion of the charge of the cell. We have further found that, if a pilot cell containing one or more negative electrodes of the composite character described is connected in a battery in series with a number of ordinary cells of similar storage capacity having monometallic electrodes, the state of charge of the pilot cell (as determined by its terminal voltage) will rather closely reflect the state of charge of the entire battery.

In making a pilot cell as set forth above, it will be desirable to select two or more metals which do not react with one another, are close together in the electromotive series, and preferably have similar storage capacity per unit of weight. Zinc, cadmium, iron and tin are among the metals adapted for the purpose referred to; the combination of zinc, and cadmium, in particular, has been found highly satisfactory.

The percentage of the residual charge remaining in a battery according to the invention can, accordingly, be at least approximately ascertained from the observation of a drop in the terminal voltage of either the entire battery or its pilot cell, this percentage being computable on the basis of the proportions of the different metals in the composite electrode or electrodes of the pilot cell. The characteristic voltage drop may be observed on charge, on discharge or on open-circuit stand.

The E.M.F. of cadmium is 1.41 volts against silver peroxide, 1.13 volts against silver oxide and 1.30 volts against nickel; the E.M.F. of zinc exceeds that of cadmium by about 0.45 volt, being thus 1.86 volts in the case of silver peroxide, 1.58 volts in the case of silver oxide and 1.75 volts in the case of nickel. If a battery with a large number of ordinary cells is used, the E.M.F. drop of 0.45 volt per pilot cell will be insignificant in relation to the overall terminal voltage.

The provision of more than one pilot cell, whose negative electrodes contain different ratios of active metal, will give rise to more than one characteristic drop in terminal voltage whereby it will be possible to discriminate between a larger number of stages in the discharge phase of the battery. A similar multi-step terminal voltage may be obtained from a single pilot cell containing more than two active metals in its negative electrode or electrodes.

The invention will be described in greater detail with reference to the accompanying drawing in which:

Fig. 1 shows, somewhat diagrammatically, a battery containing two pilot cells according to the invention;

Figs. 2 and 3 illustrate, schematically, the electrode assemblies of two modified pilot cells adapted to be used in a battery according to the invention; and Fig. 4 is a graph illustrating the terminal voltage of a battery as shown in Fig. 1.

The battery 10, Fig. 1, comprises ten series-connected cells including eight conventional silver-zinc cells 11, a first pilot cell 11a and a second pilot cell 11b. The active electropositive metal of each pilot cell is silver, as indicated. The active electronegative material of pilot cell 11a, when fully charged, consists of 50% zinc and 50% cadmium; that of pilot cell 11b in charged condition consists of 75% zinc and 25% cadmium. The output terminals of the battery are shown at 12 (negative) and 13 (positive).

As shown in Fig. 4, the open-circuit voltage measured across terminals 12, 13 of charged battery 10 is 18.6 volts, corresponding to ten times the E.M.F. of a silver-peroxide/zinc cell. After a discharge of approximately 25% of its capacity, the silver peroxide of the positive electrodes has been reduced to silver oxide and the terminal voltage drops to 15.8, the transition point at this stage being, however, somewhat indistinct. When about half of the charge of the battery and, consequently, of pilot cell 11a has been depleted, the zinc of this pilot cell is substantially completely oxidized and the cadmium thereof goes into action; this change-over being marked by a rather sharp drop of 0.45 volt in the E.M.F. of the battery, as measured between terminals 12 and 13, and of the pilot cell 11a, as measured between terminals 12a and 13a of the latter. When, subsequently, the battery is about three-quarters discharged, another such E.M.F. drop is measurable across terminals 12, 13, and also across terminals 12b, 13b of pilot cell 11b, being due to the transition from silver-zinc to silver-cadmium operation in the latter cell.

It will thus be seen that the battery terminal voltage (on open circuit, on charge or under load) is subdivided, more or less sharply, into four portions $v_1$, $v_2$, $v_3$ and $v_4$ whose open-circuit values are 18.6 volts, 15.8 volts, 15.35 volts and 14.9 volts, respectively, and that consequently the discharge phase of the battery is subdivided into four stages which can be readily distinguished by voltage measurements. It will also be seen that the last two voltage steps, due to the provision of pilot cells $11a$ and $11b$, are not only sharply defined but also small enough to afford an approximately constant terminal voltage throughout the major portion of the discharge.

In Fig. 2 we have shown, schematically, a pilot cell 111 comprising two parallel-connected negative electrodes $112a$, $112b$ and a positive electrode 113. Electrode $112a$ consists partly of zinc and partly of cadmium; electrode $112b$ consists partly of zinc and partly of tin. Electrode 113 has been shown, by way of example, as consisting of nickel oxide. It will be understood that, in practice, these electrodes are spaced from one another by suitable electrolyte-permeable separators (not shown).

A pilot cell consisting of zinc, cadmium and magnesium in approximately equal parts, will produce three different terminal voltages as first the magnesium, then the zinc and finally the cadmium are oxidized. A similar effect is obtained from the pilot cell 211 of Fig. 3, comprising a negative electrode 212 composed of iron, tin and cadmium as well as a positive electrode 213 of silver oxide. With each of these pilot cells, therefore, at least three distinct discharge stages of the battery may be easily recognized.

It should be understood that the electrodes shown in Figs. 2 and 3 are representative of bodies of active material whose several components are either commingled, as in the case of a plate pressed from a mixture of powdered zinc and cadmium, or distributed over different areas thereof, as illustrated schematically; similarly, each of two or more parallel-connected negative electrodes, such as the members $112a$ and $112b$, may contain only one active metal, e.g. zinc and cadmium respectively. The term "electrode means," as used in certain of the appended claims, is accordingly designed to embrace both a single electrode plate or body and a plurality of such bodies connected in parallel. Furthermore, while the invention has been found particularly useful in connection with alkaline batteries, it is not limited thereto according to its broader aspects; nor is it essential in all cases that the bimetallic electrode (a term intended to cover electrodes of two or more active metals) or electrode combination be of negative polarity.

Our invention, therefore, is not limited to the specific examples described and illustrated but may be embodied in various modifications without departing from the spirit and scope of the appended claims.

We claim:

1. An electric battery comprising a plurality of substantially identical cells and a pilot cell connected in series with one another, each of said identical cells including positive and negative electrode means each containing substantial quantities of only a single active metal, said pilot cell including positive and negative electrode means, said negative electrode means of said pilot cell containing substantial quantities of a plurality of different metals each forming an active couple with the active material of the other electrode means of said pilot cell.

2. An electric battery according to claim 1, wherein said other electrode means of said pilot cell contains the same active metal as the corresponding electrode means of each of said identical cells.

3. An electric battery comprising a plurality of substantially identical cells and a plurality of pilot cells connected in series with one another, each of said pilot cells including positive and negative electrode means, said negative electrode means of each of said pilot cells containing at least two different active metals each forming an active couple with the active material of the other electrode means of said pilot cell, the ratios of said different active metals being different for all of said pilot cells.

4. An electric battery comprising a principal cell and a pilot cell connected in series, said principal cell including positive electrode means containing an active metal and negative electrode means containing substantial quantities of only a single active metal, said pilot cell including positive electrode means and further including negative electrode means containing substantial quantities of a plurality of different metals each forming an active couple with the active material of the positive electrode means of said pilot cell.

5. An electric battery comprising a principal cell and a pilot cell connected in series, said principal cell including positive electrode means containing an active metal and negative electrode means containing substantial quantities of only a single active metal, said pilot cell including positive electrode means and at least two negative electrodes containing substantial quantities of different active metals each forming an active couple with the active material of the positive electrode means of said pilot cell.

6. An electric battery according to claim 5, wherein at least one of said negative electrodes of said pilot cell contains substantial quantities of each of a plurality of different active metals.

References Cited in the file of this patent

UNITED STATES PATENTS

| | | |
|---|---|---|
| 2,534,403 | Blake | Dec. 19, 1950 |
| 2,594,709 | Andre | Apr. 29, 1952 |
| 2,594,711 | Andre | Apr. 29, 1952 |
| 2,611,792 | Andre | Sept. 23, 1952 |
| 2,614,138 | Jacquier | Oct. 14, 1952 |
| 2,636,059 | Garine | Apr. 21, 1953 |
| 2,653,180 | Hignett et al. | Sept. 22, 1953 |
| 2,660,695 | Andre | Nov. 24, 1953 |
| 2,662,928 | Brennan | Dec. 15, 1953 |

FOREIGN PATENTS

| | | |
|---|---|---|
| 13,759 | Great Britain | of 1884 |